April 7, 1942.   G. L. PRESTON   2,278,897
MILLING MACHINE ATTACHMENT
Filed Nov. 13, 1941   2 Sheets-Sheet 1
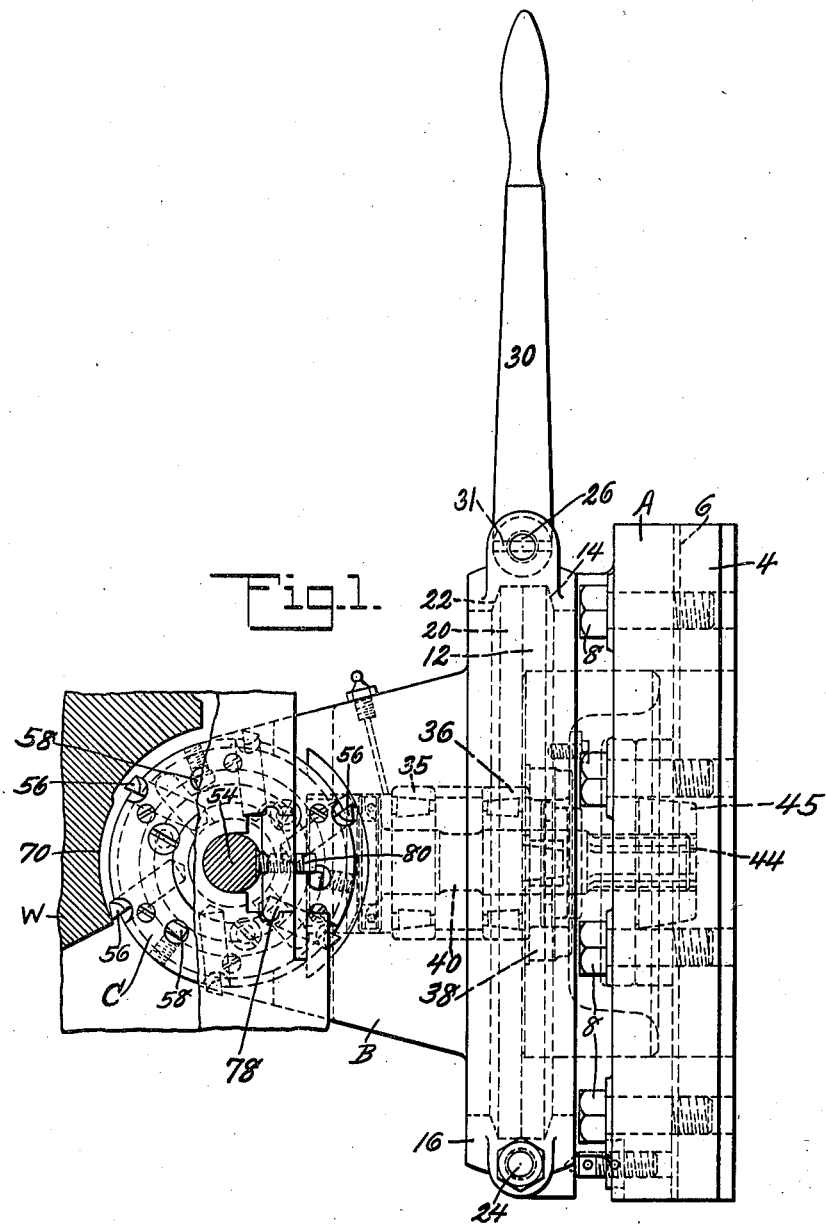
INVENTOR
George L. Preston
BY
ATTORNEY April 7, 1942.  G. L. PRESTON  2,278,897

MILLING MACHINE ATTACHMENT

Filed Nov. 13, 1941  2 Sheets-Sheet 2

INVENTOR
George L. Preston
BY
Donald U. Rich
ATTORNEY

Patented Apr. 7, 1942

2,278,897

UNITED STATES PATENT OFFICE 2,278,897

MILLING MACHINE ATTACHMENT

George L. Preston, Berwick, Pa., assignor to American Car and Foundry Company, New York, N. Y., a corporation of New Jersey Application November 13, 1941, Serial No. 418,955

10 Claims. (Cl. 90—17)

This invention relates in general to attachments for milling or similar machines and in particular to such attachments for accurately milling deep recesses. In the past milling machines and attachments for milling machines have been made for milling comparatively deep recesses but all such machines and attachments have of necessity required heavy bearings to resist the thrusts of the milling cutter and accordingly could not be used for milling excessively deep recesses. It is an object, therefore, of the present invention to provide an attachment for milling machines which is adapted to accurately mill deep recesses on the surface as well as on the ends.

A further object of the invention is the provision of an attachment for milling machines which includes a milling cutter adapted to revolve upon an arbor carried by the work.

A still further object of the invention is the provision of an attachment for milling machines including a milling cutter mounted upon bearings incapable of themselves of resisting the thrusts of the milling cutter and requiring support by a work carried arbor, to the end that deep recesses may be accurately finished.

These and other objects of the invention will be apparent to persons skilled in the art from a study of the following description and accompanying drawings, in which:

Figure 1 is a side view of the milling machine attachment with parts of the work being operated on broken away to better disclose the cutters;

Figure 3:
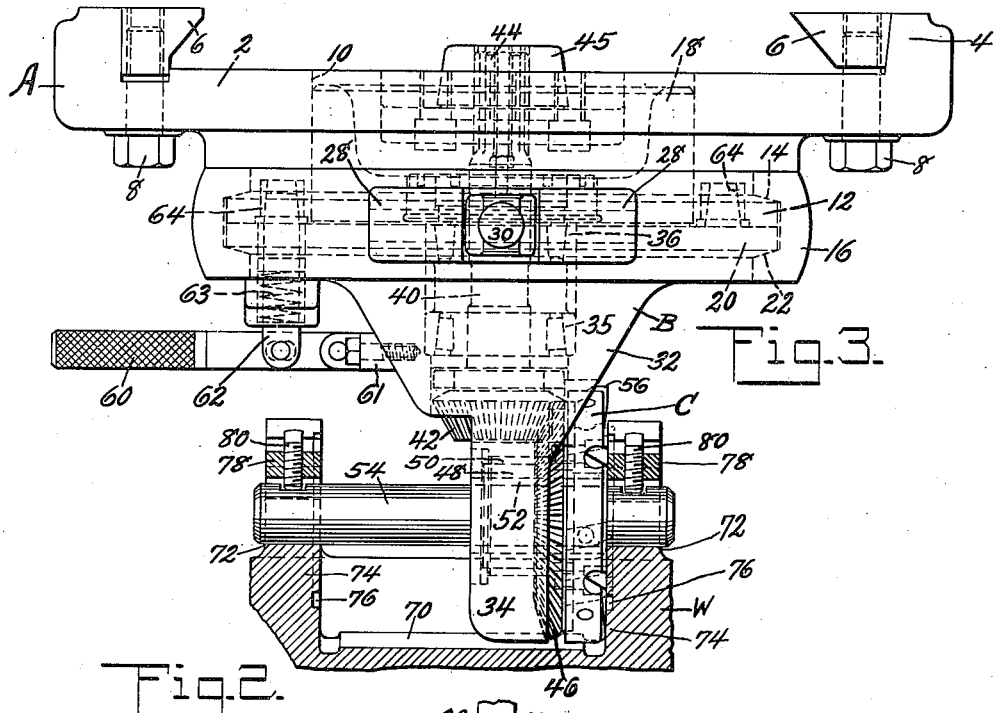
Fig. 3 is a plan view of the attachment with the work shown in section to better disclose the cutter action and support.
Figure 2:
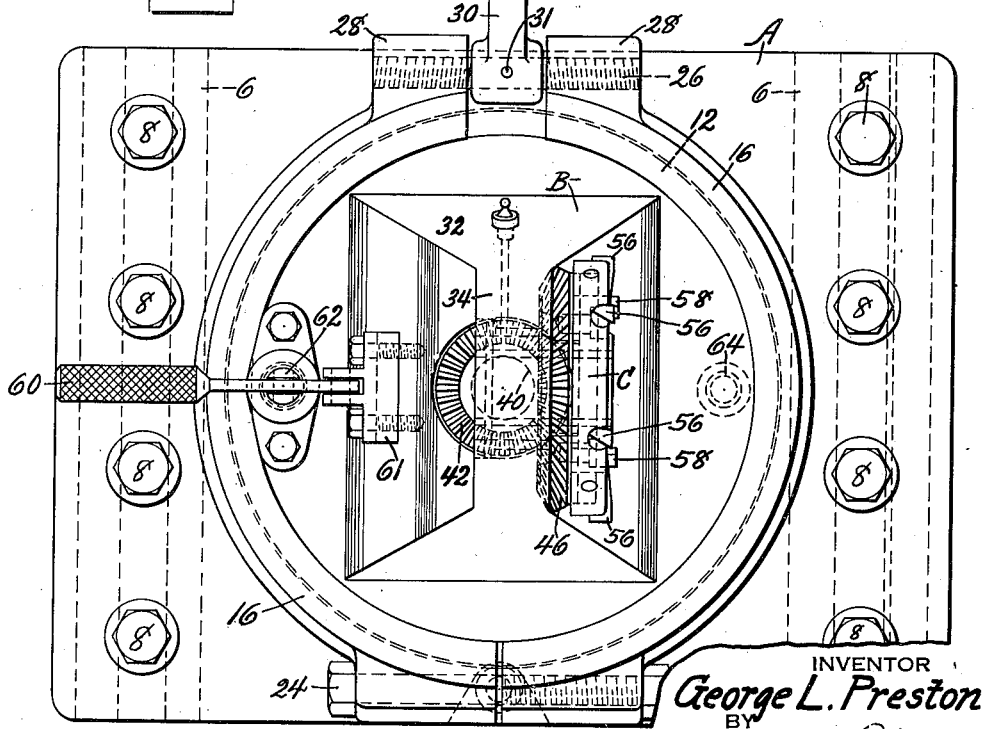
Fig. 2 is an end view of the attachment.

Referring now to the drawings in detail, it will be seen that the attachment is made up of an adapter or base A rotatably carrying a head or indexing body B, which in turn carries the milling cutter C adapted to mill the work W. The base has, in the present instance, been shown as adapted for attachment to a column and knee type of horizontal milling machine but it will, of course, be obvious that slight changes in the base will permit of its being attached to other types of milling machines. The base portion A, in the present instance, is formed with a comparatively large flat plate part 2, having inwardly extending flanges 4 formed on the edges thereof, which flanges form guides for gibs or wedges 6. These gibs or wedges are drawn toward the plate portion of the base by means of a plurality of bolts 8, thus permitting the base to be rigidly clamped to the column of the milling machine. The plate portion of the base is formed with a central opening 10 surrounded on the outer face of the plate portion by a protruding ring-like portion 12. This ring-like projection is formed with a flat outer surface and an inner beveled surface 14 adapted to cooperate with a similarly beveled surface of a clamping ring 16.

The head B is preferably formed as a casting having a sleeve-like portion 18 adapted to closely engage within the hole 10 of the base member and being provided adjacent the outer edge of the sleeve with a laterally projecting circular shoulder 20 adapted to bear upon the flat face of the ring-like projection 12. This circular shoulder has its outer surface beveled as at 22 to cooperate with a similarly beveled surface of the clamping ring 16. The clamping ring, as clearly shown, is made in two halves, held together adjacent the bottom by a bolt 24 and at the top portion by means of a right and left handed threaded screw 26 having threaded engagement in lugs 28 of the clamping ring. Intermediate the ends of the screw an operating handle 30 is rigidly attached by means of pin 31, thus by pulling the handle to the right, as viewed in Fig. 1, the halves of the clamping ring will be spread thus moving the beveled surfaces away slightly from the beveled surfaces of the circular shoulder 20 of the head and the projecting ring 12 of the base. Rotation of the operating handle to the left, as viewed in Fig. 1, will cause the halves to be moved toward each other, thus gripping the ring-like portions of the head and base and preventing any relative motion therebetween. The head portion casting is also formed with an outwardly extending portion 32 terminating in a comparatively thin rounded nose portion 34 adapted to rotatably receive the milling cutter and gear later to be described. The head portion casting is formed with a suitably finished central bore adapted to receive outer and inner thrust bearings 35 and 36, respectively, locked in place by any suitable adjustable locking ring 38. These bearings rotatably carry a shaft 40 to the outer end of which is fastened a bevel gear 42, while the inner end is splined as at 44 to slidably or non-rotatably engage within the driven shaft of the milling machine as represented by the internally splined cone-shaped member 45. The bevel gear 42 is adapted to mesh with and drive a bevel gear 46 fastened to or formed integral with a projecting collar 48 rotatably mounted in the thin projecting part 34 of the head by means of bearing 50. An additional bearing 52 is mounted inside the collar 48 and adapted to rotatably engage the arbor 54 carried by the work. The bevel gear 46 has attached thereto a flat milling cutter carrying peripheral teeth 56 and axially extending teeth 58, the former adapted to mill the surface of the deep recess and the latter adapted to mill a groove in the end wall of the deep recess. Since the head portion is rotatably mounted on the base portion of the attachment, it is necessary to positively lock the same against rotation. This is accomplished by means of an indexing handle 60 pivotally mounted on the head by means of a bracket 61 and carrying at its ends a pin 62 constantly urged toward the base of the attachment by means of a spring 63. The pin extends through an opening in the ring-like member 28 and has the inner end tapered and adapted to fit within tapered recesses 64 formed in the ring-like projection 12 of the base. These recesses may be of any number and arranged in any desired location but in the present instance only two are shown, thus permitting positive locking of the head in positions 180 degrees apart. It will be clearly seen from the preceding that the head may be rotated on the base portion of the attachment and permit the cutter to assume any desired angular position. It will also be seen that the driven gear and cutter are supported on the head only by relatively light bearings located only upon the one side of the cutter and the gear thus incapable of resisting the heavy cutter thrusts. This location of the bearings is necessary, however, in order that the cutter may be carried wholly at one side of the supporting bracket to permit accurate milling of the ends of the deep recesses.

As clearly shown in Figs. 1 and 3 the work W to be milled has a comparatively deep recess, the surface 70 of which must be finished absolutely concentric with the bearing portion 72. The work also has end walls 74 closing the ends of the recess and these walls must have machined therein a groove 76 which must also be absolutely concentric with the axis of the bearing 72. In preparing the work for the milling operation the bearings 72 are finished and the work clamped in position on the bed of the milling machine, after which the arbor 54 is inserted through bearing 52 of the milling head and the whole advanced into the recess until the milling cutter has worked itself in sufficiently to permit arbor 54 to fully seat in bearings 72. With the shaft fully seated blocks 78 are slid into position in the work and set screws 80 tightened, thus non-rotatably holding arbor 54 in its seat on the work. The bed and work may now be shifted causing the arbor to slide within bearings 52 while the milling cutter works its way to the end of the deep recess, thus finishing surface 70 and then cutting groove 76. As soon as the groove 76 on one end has been finished set screws 80 are loosened, blocks 78 removed and the work retracted from the cutting head, after which the pin 62 is removed from the tapered holes 64 by means of the indexing handle 60, then upon loosening of the clamping ring by handle 30 the entire head may be swung through 180 degrees, placing the milling cutter on the opposite side of gear 42 then, after the parts are secured in position and the head locked, the work may be again advanced toward the milling cutter and the arbor 54 clamped in position. Then shifting of the bed and rotation of the cutter will permit the finishing of surface 70 and the cutting of groove 76 in the opposite end wall of the work. Thus it will be seen that a comparatively deep recess may be accurately machined on its surface and on its end by means of a milling cutter rotated about an arbor carried by the work, therefore, there can be no chatter of the cutter and the milling surfaces and groove must be absolutely concentric with the axis or center of the bearings 72. In this manner the accurately machined parts which must rotate in the recess about a permanent shaft, taking the place of arbor 54, will operate properly. In actual practice it is found to be of advantage to take a first roughing cut with one machine set up for such roughing cut, then to move the work to a second machine set up for the finishing operation. However, one machine could readily take care of all roughing cuts for a certain period of the day and then the cutting head be changed to take care of the finishing cuts.

While the attachment has been described more or less in detail and illustrated as adapted for attachment to column and knee type of horizontal milling machine, it will be obvious that the attachment may readily be adapted to fit other types of machines and accomplish the same results. Accordingly all modifications are contemplated which will fall within the scope of the appended claims defining the invention.

What is claimed is:

1. In an attachment for milling or like machines having a drive shaft the combination of a base secured to the machine, a head carried by the base, a shaft journaled in the head and adapted to be driven by the drive shaft of the machine, a first gear on said first named shaft, a second gear journaled in said head and meshing with said first gear, a milling cutter secured to said second gear and rotatable therewith, and a bearing located within said second gear and adapted to support the same for rotation about an arbor carried by the work to be milled.

2. In an attachment for milling or like machines having a drive shaft the combination of a base secured to the machine, a head rotatably carried by the base, means to lock said head in a plurality of rotated positions, a gear journaled in said head, means carried by said head and adapted to drive said gear, a bearing located within said gear and adapted to support the same for rotation about an arbor carried by the work, and a milling cutter fastened to said gear and rotatable therewith to mill the work.

3. In an attachment for milling or like machines having a drive shaft the combination of a head carried by the machine, a milling cutter rotatably carried by said head on bearings located wholly upon one side of the cutter, means to cause rotation of said cutter, and means extending through said cutter and carried by the work being milled thereby forcing said cutter to rotate about an axis fixed with respect to the work.

4. In an attachment for milling or like machines having a drive shaft the combination of a base secured to the machine, a head portion rotatably carried by the base, locking means to lock said head relative to the base and in a plurality of rotated positions, a milling cutter rotatably carried by said head upon bearings located wholly upon one side of the cutter, means to cause rotation of the cutter, and an arbor extending through said cutter and carried by the work being milled thereby forcing said cutter to rotate about an axis fixed with respect to the work.

5. In an attachment for milling or like machines having a drive shaft the combination of a head carried by the machine, a milling cutter rotatably carried by said head on bearings located wholly upon one side of the cutter, means to cause rotation of said cutter, and means extending through said cutter and carried by the work being milled thereby forcing said cutter to rotate about an axis fixed with respect to the work, said last named means remaining fixed relative to the work and being capable of sliding axially of said cutter to permit milling of cylindrical surfaces.

6. In an attachment for milling or like machines having a drive shaft the combination of a base secured to the machine, a head portion rotatably carried by the base, locking means to lock said head relative to the base and in a plurality of rotated positions, a milling cutter rotatably carried by said head upon bearings located wholly upon one side of the cutter, means to cause rotation of the cutter, and an arbor extending through said cutter and carried by the work being milled thereby forcing said cutter to rotate about an axis fixed with respect to the work, said arbor being fixed relative to the work and being axially slidable relative to cutter to thereby permit milling of surfaces concentric with said arbor axis.

7. In a machine for milling work the combination of a milling cutter, bearings supporting said cutter for rotation about an axis, means to rotate said cutter about said axis, and an arbor extending through said cutter and fastened to the work and having its axis substantially coincident with said cutter axis whereby surfaces may be milled concentric with said arbor axis.

8. In a machine for milling work the combination of a milling cutter, bearings supporting said cutter for rotation about an axis, means to rotate said cutter about said axis, an arbor extending through said cutter and secured to the work, said arbor having its axis substantially coincident with said cutter axis and being slidable through said cutter whereby cylindrical surfaces may be milled concentric with said arbor axis.

9. In a machine for milling work the combination of a milling cutter, bearings supporting said cutter for rotation about an axis, means to rotate said cutter about said axis, and an arbor extending through said cutter and fastened to the work and having its axis substantially coincident wtih said cutter axis whereby surfaces may be milled concentric with said arbor axis, said bearings being located wholly upon one side of said cutter whereby axial teeth may be attached to the cutter to mill grooves in the work concentric to the arbor axis.

10. In a machine for milling work the combination of a milling cutter, bearings supporting said cutter for rotation about an axis, means to rotate said cutter about said axis, and an arbor extending through said cutter and fastened to the work and having its axis substantially coincident with said cutter axis, said arbor preventing vibration of said cutter and forcing said cutter to finish surfaces concentric with the axis of the arbor carried by the work.

GEORGE L. PRESTON.